US012661721B2

(12) United States Patent
Ogawa

(10) Patent No.: US 12,661,721 B2
(45) Date of Patent: Jun. 23, 2026

(54) DRILL AND METHOD FOR MANUFACTURING MACHINED PRODUCT

(71) Applicant: KYOCERA CORPORATION, Kyoto (JP)

(72) Inventor: Hiroshi Ogawa, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 662 days.

(21) Appl. No.: 17/629,780

(22) PCT Filed: Jul. 22, 2020

(86) PCT No.: PCT/JP2020/028371
§ 371 (c)(1),
(2) Date: Jan. 25, 2022

(87) PCT Pub. No.: WO2021/020259
PCT Pub. Date: Feb. 4, 2021

(65) Prior Publication Data
US 2022/0314344 A1 Oct. 6, 2022

(30) Foreign Application Priority Data
Jul. 26, 2019 (JP) ................................. 2019-137648

(51) Int. Cl.
*B23B 51/08* (2006.01)
*B23B 51/02* (2006.01)
*B23D 77/00* (2006.01)

(52) U.S. Cl.
CPC .............. *B23B 51/08* (2013.01); *B23B 51/02* (2013.01); *B23D 77/00* (2013.01); *B23B 2251/40* (2013.01)

(58) Field of Classification Search
CPC .......... B23B 2251/56; B23B 2251/285; B23B 51/02; B23B 51/08; B23B 2251/44;
(Continued)

(56) References Cited

U.S. PATENT DOCUMENTS 327,148 A * 9/1885 Faught .................... B23B 51/00
408/229
5,282,705 A * 2/1994 Shiga ...................... B23B 51/00
408/229
(Continued)

FOREIGN PATENT DOCUMENTS

CN 108161083 A * 6/2018
JP H647619 A 2/1994
(Continued)

OTHER PUBLICATIONS

Translation of CN108161083, Shen, A Drilling reamer used for car steering knuckle main pin hole machining, Jun. 15, 2018, pp. 4.*

*Primary Examiner* — Sunil K Singh
*Assistant Examiner* — Eric Daniel Whitmire
(74) *Attorney, Agent, or Firm* — HAUPTMAN HAM, LLP

(57) ABSTRACT

A drill may include a base. The base may be extended from a first end to a second end. The base may include a first part, a second part, a step, a first cutting edge, a first flute, a second cutting edge and a second flute. The step may be located between the first part and the second part, and may have a larger outer diameter as coming closer to the second part. The first flute may be extended from the first cutting edge. The second flute may be extended from the second cutting edge. The step may include a first step and a second step. The first step may connect to the first flute. The second step may connect to the second flute. A first end part in the first step may be located further away from the first end than a second end part in the second step.

9 Claims, 11 Drawing Sheets

(58)  Field of Classification Search
CPC .. B23B 2251/443; B23D 77/00; B23D 77/14;
B23D 2277/105; B23D 2277/203; B23D
2277/32; B23D 2277/46
See application file for complete search history.

(56)  References Cited

U.S. PATENT DOCUMENTS

2012/0034043 A1*  2/2012  Krieg ...................... B23B 51/02
408/230
2017/0056981 A1  3/2017  Higashiwaki et al.

FOREIGN PATENT DOCUMENTS

| JP | 201322721 A | 2/2013 |
| JP | 201747486 A | 3/2017 |
| JP | 2017202541 A | 11/2017 |

* cited by examiner

FIG. 3
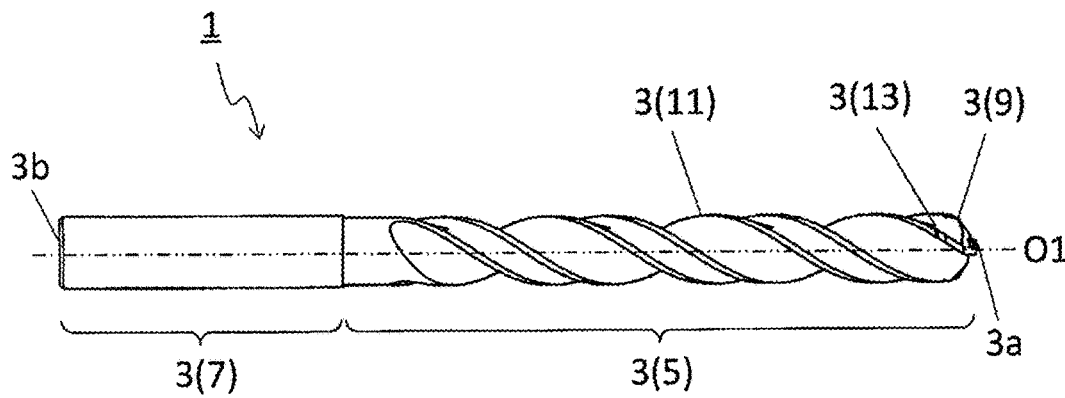
FIG. 4
FIG. 5
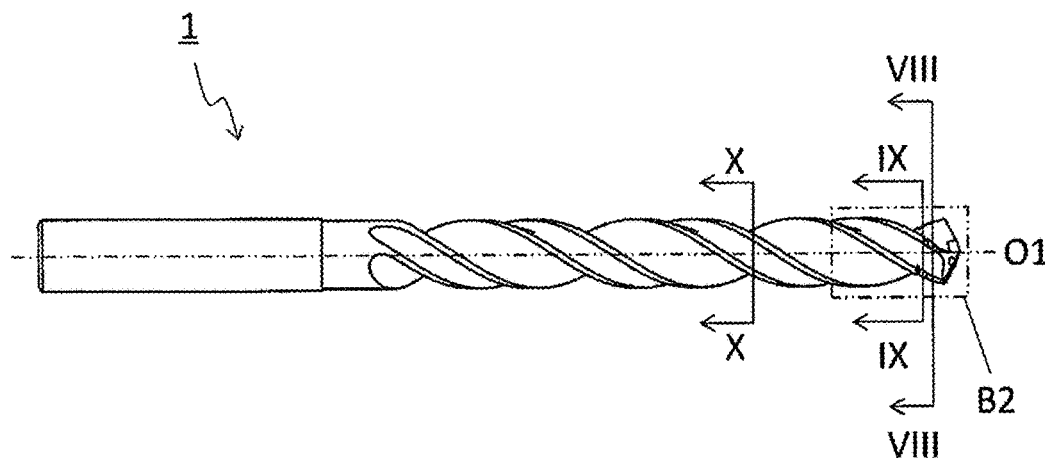

DRILL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2020/028371, filed Jul. 22, 2020, which claims priority to Japanese Patent Application No. 2019-137648, filed Jul. 26, 2019. The contents of these applications are incorporated herein by reference in their entirety.

TECHNICAL FIELD

The present disclosure may generally relate to a drill used in a cutting process of a workpiece. Examples of the drill may include indexable drills and solid drills.

BACKGROUND

Drills are discussed in Japanese Unexamined Patent Publication No. 2013-022721 (Patent Document 1) and Japanese Unexamined Patent Publication No. 2017-202541 (Patent Document 2) as a drill used for carrying out a drilling process of a workpiece, such as metal. The drill discussed in Patent Document 1 may include a reamer edge of two steps or more. The drill discussed in Patent Document 2 may include a drill land and a reamer land. Both the drills discussed in Patent Documents 1 and 2 may include a tip edge which is located at a front end and plays a main role in the drilling process, and the reamer edge which is located on an outer periphery and plays a role in increasing an inner diameter of a machined hole.

A flute connecting to the tip edge may be continuous with a flute connecting to the reamer edge in the drills described in both Patent Documents 1 and 2. Therefore, if carrying out a cutting process using the drill described in Patent Documents 1 and 2, chips generated at the tip edge might be entangled with chips generated at the reamer edge.

SUMMARY

A drill in a non-limiting aspect of the present disclosure may include a base. The base may be extended along a rotation axis from a first end to a second end, and may be rotatable around the rotation axis. The base may include a first part, a second part, a step, a first cutting edge, a first flute, a second cutting edge and a second flute. The first part may be located so as to include the first end. The second part may be located closer to the second end than the first part, and may have a larger outer diameter than the first part. The step may be located between the first part and the second part, and may have a larger outer diameter as coming closer to the second part. The first cutting edge may include the first end. The first flute may be extended from the first cutting edge toward the second end. The second cutting edge may be located away from the first flute. The second flute may be extended from the second cutting edge toward the second end.

The step may include a first step and a second step. The first step may connect to the first flute on a rear side in a rotation direction of the rotation axis. The second step may connect to the second flute on a rear side in the rotation direction. The second cutting edge may be located on the second step. A first end part on a side of the first end in the first step may be located further away from the first end than a second end part on a side of the first end in the second step.

BRIEF DESCRIPTION OF THE DRAWINGS

FIG. 3 is a side view of the drill illustrated in FIG. 2 as viewed from an A1 direction;

FIG. 4 is a side view of the drill illustrated in FIG. 2 as viewed from an A2 direction;

FIG. 5 is a side view of the drill illustrated in FIG. 2 as viewed from an A3 direction;

EMBODIMENTS

<Drills>

Figure 1:
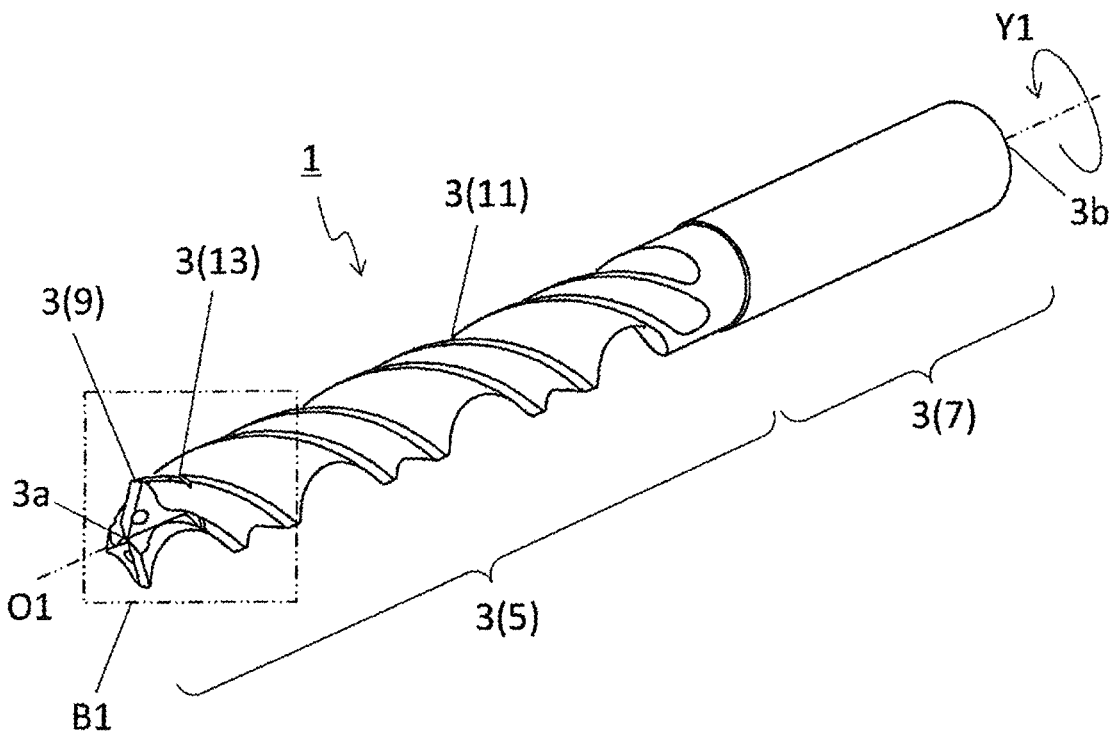
FIG. 1 is a perspective view illustrating a drill in a non-limiting embodiment of the present disclosure.

A drill 1 in a non-limiting embodiment of the present disclosure may be described in detail below with reference to the drawings. For convenience of description, the drawings referred to in the following may illustrate, in simplified form, only main members necessary for describing the embodiments. The drill 1 may therefore include any arbitrary structural member not illustrated in the drawings referred to. Dimensions of the members in each of the drawings may faithfully represent neither dimensions of actual structural members nor dimensional ratios of these members.

FIGS. 1 to 10 may illustrate a solid drill, specifically a stepped drill including two steps as an embodiment of the drill 1. The drill 1 is not limited to the stepped drill including two steps, and may be, for example, a stepped drill including three or more steps. The drill 1 is not limited to the solid drill, and may be, for example, an indexable drill.

The drill 1 may include a base 3 as in a non-limiting embodiment illustrated in FIG. 1. The base 3 may be extended along a rotation axis O1 from a first end 3a to a second end 3b. More specifically, the base 3 may have a bar shape extended along the rotation axis O1 from the first end 3a to the second end 3b. In general, the first end 3a may be called "a front end," and the second end 3b may be called "a rear end." The base 3 may be rotatable around the rotation axis O1. An arrow Y1 in FIG. 1 and the like may indicate a rotation direction of the rotation axis O1.

The base 3 may include a cutting part 5 and a shank part 7. The shank part 7 may be a part that can be held by a spindle to be rotated in a machine tool. The shank part 7 may be designed according to a shape of the spindle in the machine tool. Examples of the shape of the shank part 7 may include straight shank, long shank, long neck and tapered shank. Examples of the machine tool that holds the shank part 7 may include hand drills and machining centers.

The cutting part 5 may be located on a side of the first end 3*a* relative to the shank part 7. The cutting part 5 may include a cutting portion which is brought into contact with a workpiece and plays a main role in a cutting process of the workpiece.

An outer diameter D of the cutting part 5 is not limited to a specific value. For example, a maximum value of the outer diameter D may be set to 4-50 mm. A length L of the cutting part 5 in a direction along the rotation axis O1 may be set to L=1.5 D to L=12 D.

The base 3 may include a first part 9, a second part 11 and a step 13. The first part 9 may be located so as to include the first end 3*a*. The second part 11 may be located closer to the second end 3*b* than the first part 9, and may have a larger outer diameter than the first part 9. The step 13 may be located between the first part 9 and the second part 11, and may have a larger outer diameter as coming closer to the second part 11.

The first part 9 may be usable for carrying out a roughing process. The second part 11 may be usable for carrying out a finishing process. An outer diameter of each of the first part 9 and the second part 11 is not limited to a specific value. For example, the outer diameter of the first part 9 may be set to 2-25 mm. The outer diameter of the second part 11 may be set to 4-50 mm.

A length L1 of the first part 9 in a direction along the rotation axis O1 may be equal to or different from a length L2 of the second part 11 in the direction along the rotation axis O1. If the length L1 is smaller than the length L2 as in a non-limiting embodiment illustrated in FIG. 4, may be possible to carry out an efficient machining from the roughing process to the finishing process in a short period of time.

The step 13 may be servable as a part to create a smooth connection between the first part 9 and the second part 11. The step 13 may directly connect to the first part 9, or may connect through other portion to the first part 9. This may also be true for a connection between the step 13 and the second part 11. For example, if the step 13 connects directly to each of the first part 9 and the second part 11 as in the non-limiting embodiment illustrated in FIG. 1, the first part 9 and the second part 11 may tend to smoothly connect to each other.

A length L3 of the step 13 in the direction along the rotation axis O1 may be equal to or different from the length L1. This may also be true for a relationship between the length L3 and the length L2. If the length L3 is smaller than each of the lengths L1 and L2 as in a non-limiting embodiment illustrated in FIG. 4, the drill 1 may have enhanced straightline stability when cutting out a workpiece, thus leading to a highly accurate drilling process.

The base 3 may include a first cutting edge 15, a first flute 17, a second cutting edge 19 and a second flute 21. The first cutting edge 15 may be located so as to include the first end 3*a*. The first flute 17 may be extended from the first cutting edge 15 toward the second end 3*b*. The second cutting edge 19 may be located away from the first flute 17. The second flute 21 may be extended from the second cutting edge 19 toward the second end 3*b*.

The first cutting edge 15 may also be called a tip edge. The first cutting edge 15 may be usable for cutting out the workpiece during the cutting process. The number of the first cutting edge 15 may be at least one or a plural number. If the number of the first cutting edge 15 is the plural number, the number thereof may be 2 to 5. These points may also be true for the second cutting edge 19. The drill 1 may be a so-called 2-cutting edge drill as in the non-limiting embodiment illustrated in FIG. 1.

In cases where the number of the first cutting edge 15 is the plural number, the first cutting edges 15 may be located so as to have rotational symmetry relative to the rotation axis O1 in a plan view from a side of the first end 3*a*. Specifically, if the number of the first cutting edges 15 is two as in the non-limiting embodiment illustrated in FIG. 2, the two first cutting edges 15 may be located so as to have 180-degree rotational symmetry relative to the rotation axis O1 in the plan view from the side of the first end 3*a*. This may lead to enhanced straightline stability of the drill 1 when cutting out the workpiece. These points may also be true for the second cutting edge 19.

The first flute 17 may be usable for discharging chips generated by the first cutting edge 15 to outside. The number of the first flute 17 may be at least one or may be a plural number. The number of the first flute 17 may be equal to the number of the first cutting edge 15. These points may also be true for the second flute 21.

The first flute 17 may directly connect to the first cutting edge 15. This may lead to enhanced biting performance against the workpiece. The first flute 17 may connect to the first cutting edge 15 with a rake surface interposed therebetween. This may contribute to a stable discharge direction of the chips generated by the first cutting edge 15. These points may also be true for the second flute 21.

The first flute 17 may be extended parallel to the rotation axis O1, or may be twisted around the rotation axis O1. In other words, the first flute 17 may be extended spirally on a basis of the rotation axis O1. From the viewpoint of smoothly discharging the chips to outside, the first flute 17 may have a concave curvilinear shape in a cross section orthogonal to the rotation axis O1. These points may also be true for the second flute 21.

The second cutting edge 19 may also be called a reamer edge. The second cutting edge 19 may be usable for increasing an inner diameter of a hole formed by the first cutting edge 15. The number of the second cutting edge 19 may be equal to the number of the first cutting edge 15.

The first part 9, the second part 11, the step 13, the first cutting edge 15, the first flute 17, the second cutting edge 19 and the second flute 21 may be located in the cutting part 5. Alternatively, the first part 9, the second part 11, the step 13, the first cutting edge 15, the first flute 17, the second cutting edge 19 and the second flute 21 may be the cutting portion as described above.

Figure 6:
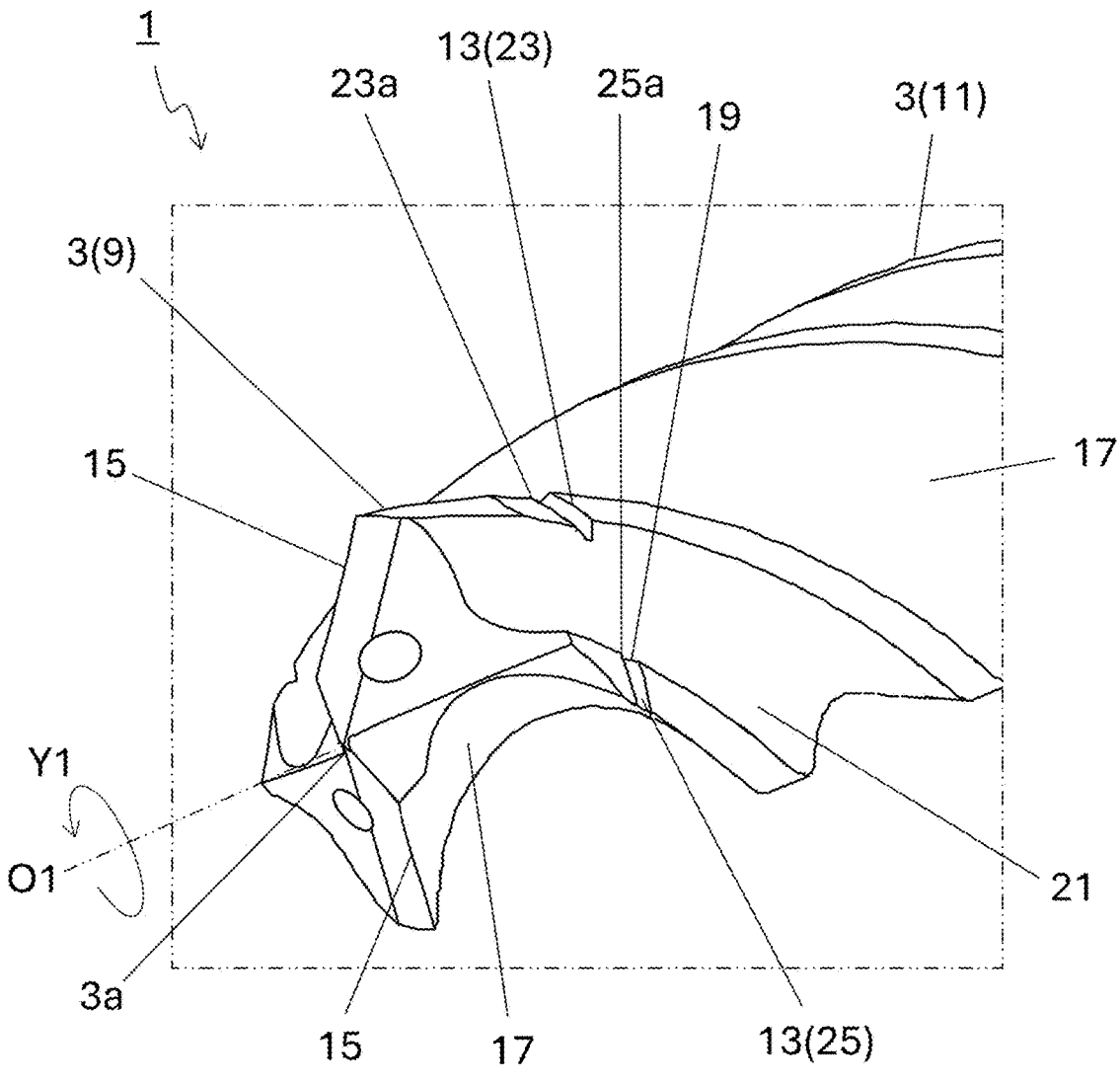
FIG. 6 is an enlarged view of a region B1 illustrated in FIG. 1.
Figure 7:
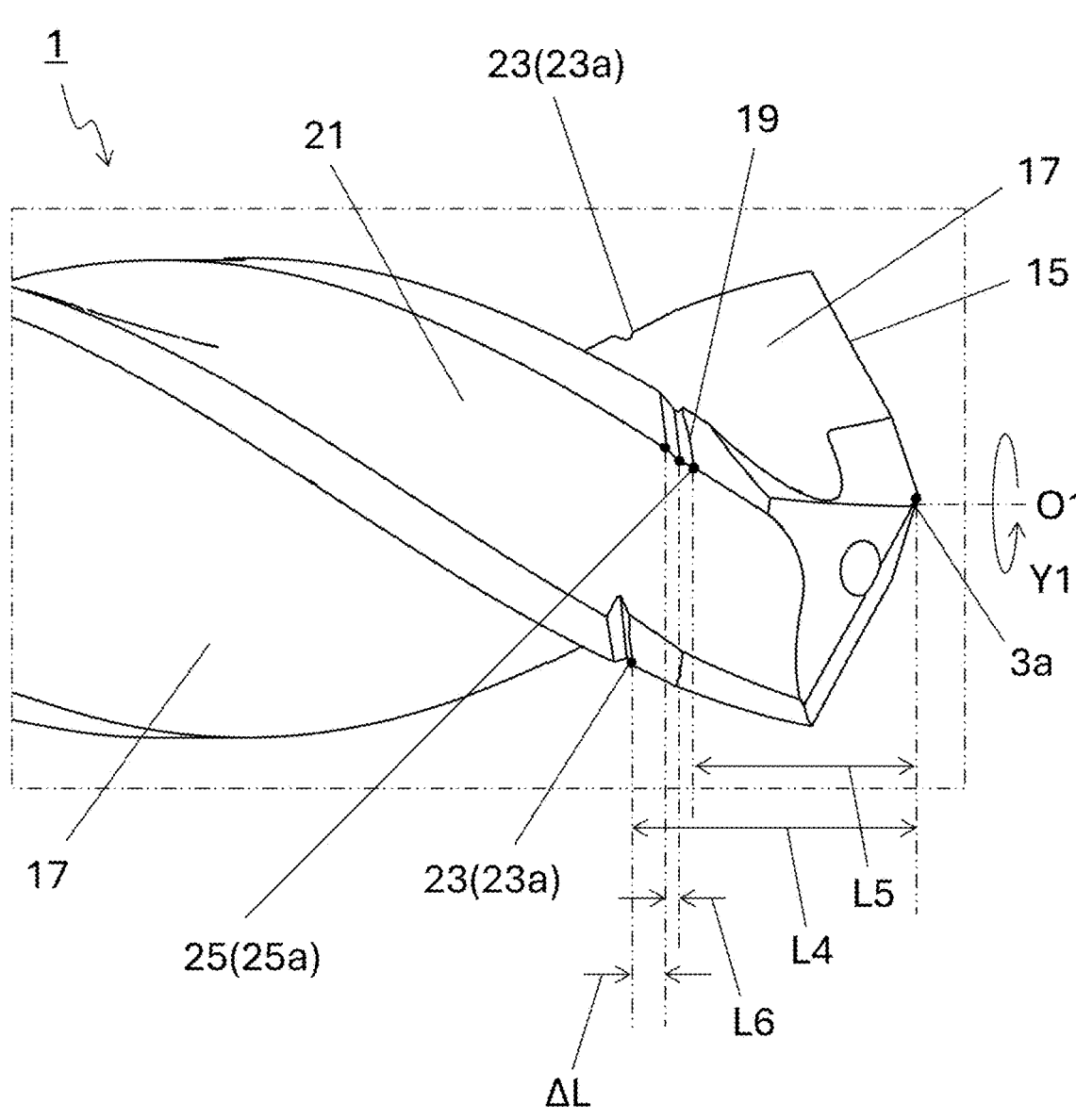
FIG. 7 is an enlarged view of a region B2 illustrated in FIG. 5.
Figure 8:
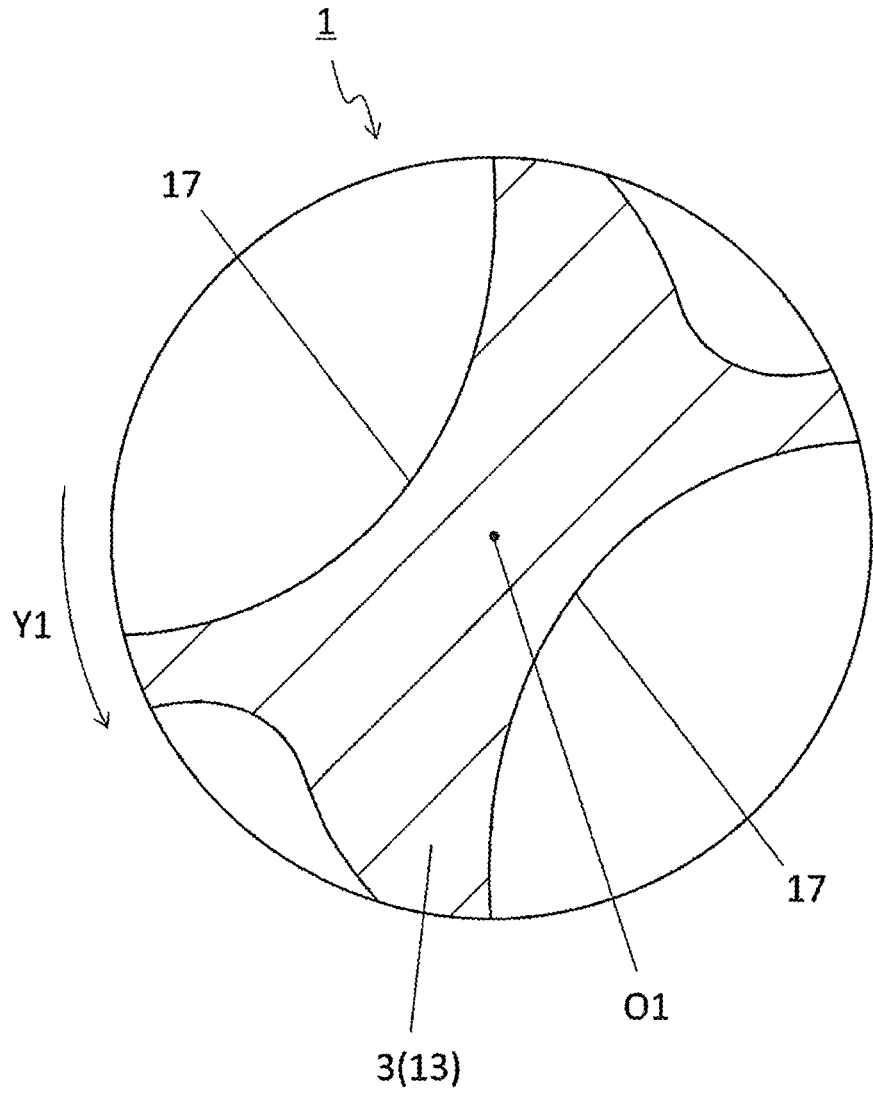
FIG. 8 is a sectional view taken along the line VIII-VIII in the drill illustrated in FIG. 5.
Figure 9:
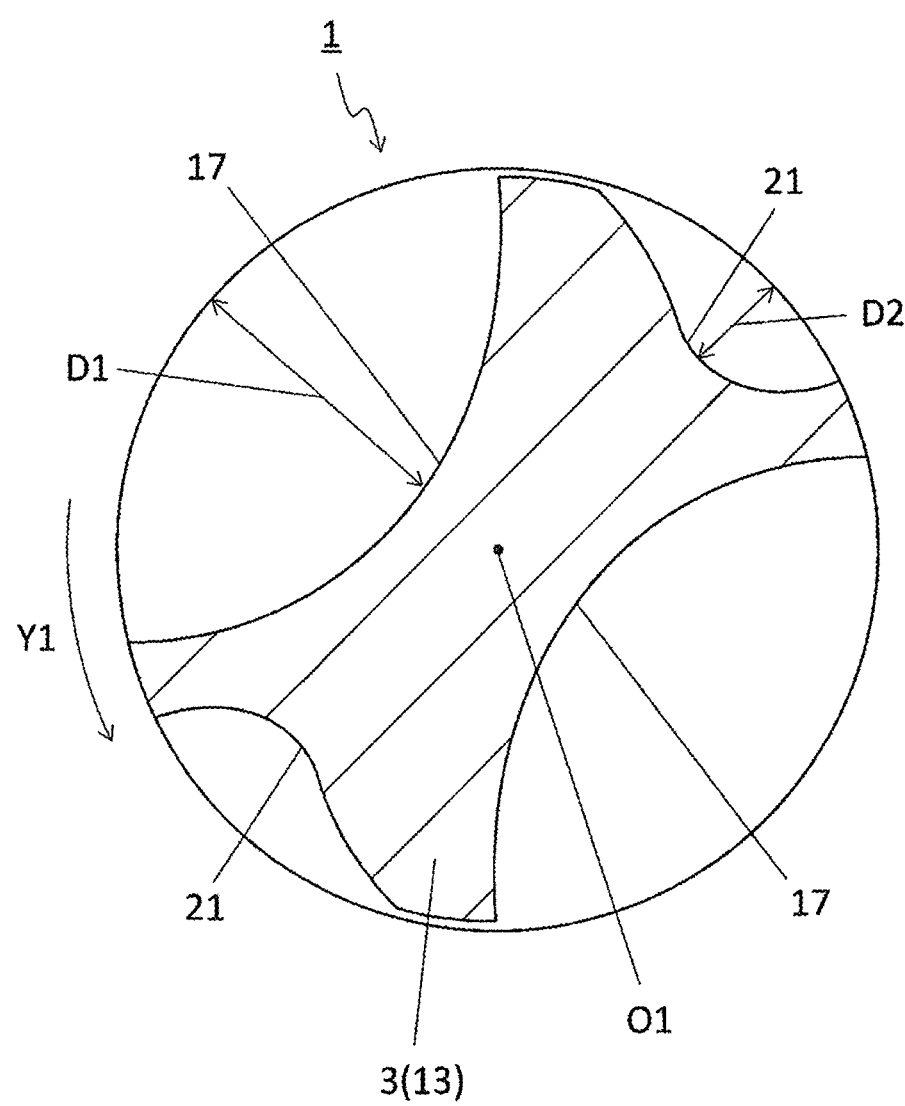
FIG. 9 is a sectional view taken along the line IX-IX in the drill illustrated in FIG. 5.

The second cutting edge 19 and the second flute 21 may be located away from the first flute 17 as in a non-limiting embodiment illustrated in FIGS. 6 and 7. The step 13 may include a first step 23 and a second step 25. The first step 23 may connect to the first flute 17 on a rear side of the rotation direction Y1 of the rotation axis O1. The second step 25 may connect to the second flute 21 on the rear side in the rotation direction Y1. A first end part 23*a* located on a side of the first end 3*a* in the first step 23 may be located further away from the first end 3*a* than a second end part 25*a* located on a side of the first end 3*a* in the second step 25. More specifically, the first end part 23*a* may be located further away from the first end 3*a* than the second end part 25*a* in a side view. The second cutting edge 19 may be located at the second step 25.

The above configuration may ensure high chip discharge performance. That is, because the second cutting edge 19 is located closer to the first end 3*a* than the first end part 23*a*, the second cutting edge 19 may be brought into contact with a workpiece sooner than the first end part 23*a* when cutting out the workpiece. This may make it easier for the second cutting edge 19 to cut out the workpiece. Additionally, because the first end part 23*a* does not serve as a cutting edge, no chip may occur at the first end part 23*a*. Moreover, because the second cutting edge 19 and the second flute 21 are located away from the first flute 17, chips generated by the first cutting edge 15 may be less likely to entangle with chips generated by the second cutting edge 19, thus leading to the high chip discharge performance.

As used herein, the term "side view" may denote a state as viewed from a direction orthogonal to the rotation axis O1. In cases where the first end part 23*a* in the first step 23 is located further away from the first end 3*a* than the second end part 25*a* in the second step 25, a part of the second step 25 may be located further away from the first end 3*a* than the first end part 23*a*. Alternatively, the whole of the first step 23 may be located further away from the first end 3*a* than the second step 25.

The first end part 23*a* may be located at an end part on a front side in the rotation direction Y1 in the first step 23. Similarly, the second end part 25*a* may be located at an end part on a front side in the rotation direction Y1 in the second step 25.

A difference ΔL between a length from the first end 3*a* to the first step 23 in the direction along the rotation axis O1 and a length from the first end 3*a* to the second step 25 in the direction along the rotation axis O1 may be equal to or different from a length L6 of the second cutting edge 19 in the direction along the rotation axis O1. The difference ΔL may be rephrased as a length from the first step 23 to the second step 25 in the direction along the rotation axis O1. The difference ΔL may be evaluated by a minimum value.

If the difference ΔL is larger than the length L6 as in a non-limiting embodiment illustrated in FIG. 7, it may be possible to stably carry out a cutting process by the second cutting edge 19, and the first step 23 may be less likely to come into contact with the workpiece. Consequently, the drill 1 may have enhanced durability, and a machined surface of the workpiece may have a good surface accuracy.

Figure 2:
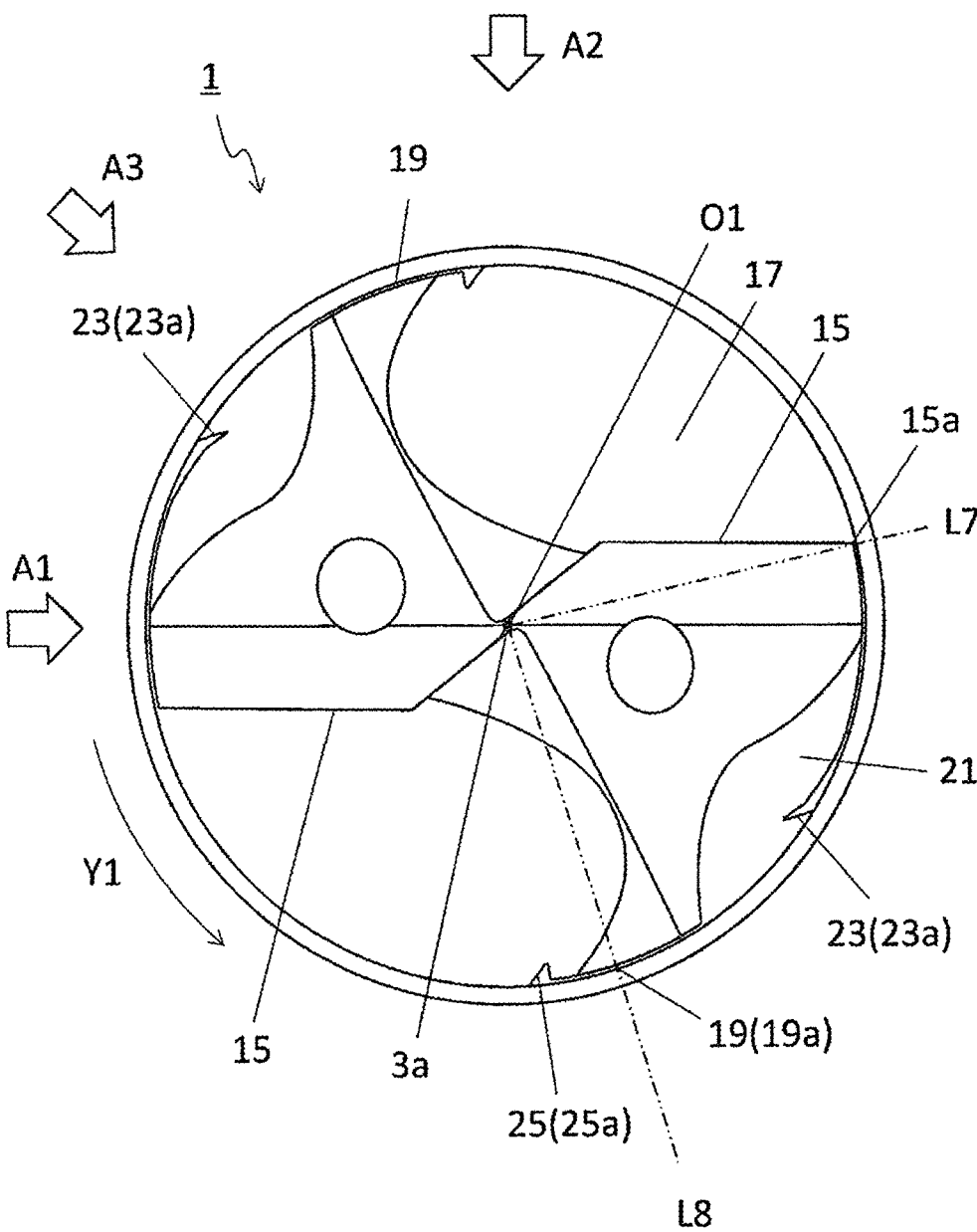
FIG. 2 is a plan view of the drill illustrated in FIG. 1 as viewed from a side of a first end.

A first imaginary straight line L7 connecting an end part 15*a* on a side of the outer periphery in the first cutting edge 15 and the rotation axis O1 and a second imaginary straight line L8 connecting an end part 19*a* on a side of the outer periphery in the second cutting edge 19 and the rotation axis O1 may be orthogonal to each other in a plan view from a side of the first end 3*a* as in the non-limiting embodiment illustrated in FIG. 2. With this configuration, the straightline stability of the drill 1 may tend to be improved when both the first cutting edge 15 and the second cutting edge 19 may be brought into contact with the workpiece.

The phrase that the first imaginary straight line L7 and the second imaginary straight line L8 are orthogonal to each other may denote that both are approximately orthogonal to each other, and both need not be strictly orthogonal to each other. Orthogonality between the first imaginary straight line L7 and the second imaginary straight line L8 may include a range of 90 degrees ±20 degrees.

An outer peripheral surface of the second part 11 may include a first portion 27 connecting to the first flute 17 on a rear side in the rotation direction Y1, and a second portion

Figure 10:
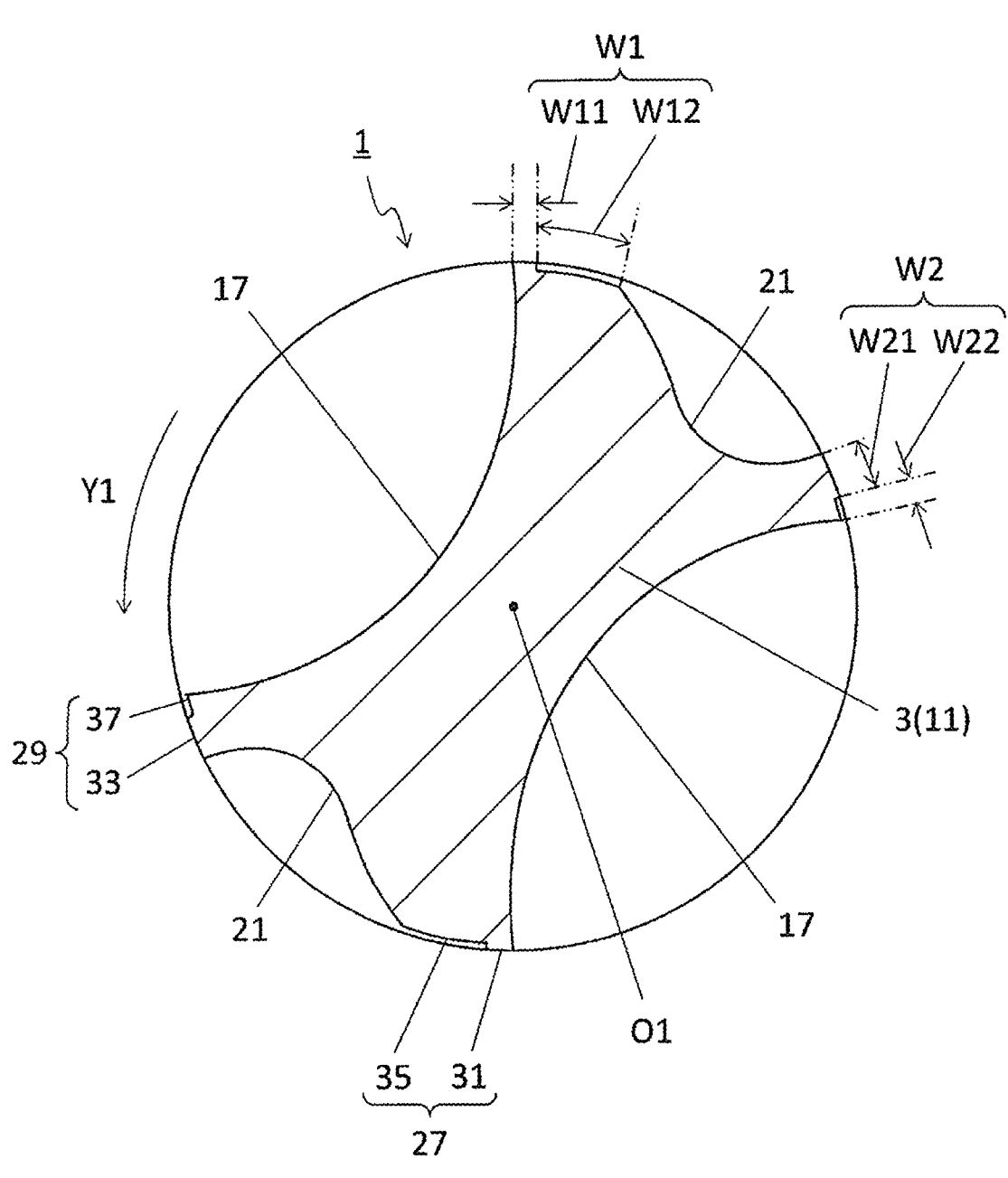
FIG. 10 is a sectional view taken along the line X-X in the drill illustrated in FIG. 5.

29 connecting to the second flute 21 on the rear side in the rotation direction Y1 as in a non-limiting embodiment illustrated in FIG. 10. The first portion 27 and the second portion 29 may also be called a land.

A width W1 of the first portion 27 in a circumferential direction of the rotation axis O1 may be equal to or different from a width W2 of the second portion 29 in the circumferential direction in a cross section orthogonal to the rotation axis O1. If the width W1 is larger than the width W2 in the cross section orthogonal to the rotation axis O1 as in the non-limiting embodiment illustrated in FIG. 10, the drill 1 may have enhanced durability. This may be because a cutting load applied to the first cutting edge 15 is larger than a cutting load applied to the second cutting edge 19.

The width W1 and the width W2 are not limited to a specific value. For example, the width W1 may be set to 4-25% of a full length of the outer periphery of the base 3 (the cutting part 5) in the cross section orthogonal to the rotation axis O1. The width W2 may be set to 2-20%.

The first portion 27 may include a first margin 31. The second portion 29 may include a second margin 33. The first margin 31 and the second margin 33 may be located on the outer periphery of the base 3. That is, the first margin 31 and the second margin 33 may be a circular arc portion corresponding to the outer periphery of the base 3 in the cross section orthogonal to the rotation axis O1. The first margin 31 and the second margin 33 may be servable as a portion to stabilize operability of the drill 1 by being brought into sliding contact with an inner wall surface of a hole formed by the second cutting edge 19.

A width W11 of the first margin 31 in the circumferential direction may be equal to or different from a width W21 of the second margin 33 in the circumferential direction in the cross section orthogonal to the rotation axis O1. If the width W21 is larger than the width W11 in the cross section orthogonal to the rotation axis O1 as in a non-limiting embodiment illustrated in FIG. 10, a stable drilling process may become possible because of easy sliding contact with the inner wall surface of the machined hole.

The first portion 27 may further include a first clearance 35 connecting to the first margin 31 on a rear side in the rotation direction Y1. The second portion 29 may further include a second clearance 37 connecting to the second margin 33 on the rear side in the rotation direction Y1. The first clearance 35 may be recessed relative to the first margin 31. Similarly, the second clearance 37 may be recessed relative to the second margin 33. The first clearance 35 and the second clearance 37 may be usable for reducing friction with a workpiece in a cutting process.

A width W12 of the first clearance 35 in the circumferential direction may be equal to or different from a width W22 of the second clearance 37 in the circumferential direction in the cross section orthogonal to the rotation axis O1. The width W12 may be larger than the width W22 in the cross section orthogonal to the rotation axis O1 as in a non-limiting embodiment illustrated in FIG. 10.

A depth D1 of the first flute 17 may be equal to or different from a depth D2 of the second flute 21. Enhanced chip discharge performance may be attainable if the depth D1 is larger than the depth D2 as in the non-limiting embodiment illustrated in FIG. 9.

The depth of the first flute 17 and the depth of the second flute 21 are not limited to a specific value. For example, the depth D1 may be set to 25-40% of the outer diameter of the base 3 (the cutting part 5). The depth D2 may be set to 10-30% thereof. The depth D1 of the first flute 17 may be a value obtained by subtracting a distance between a bottom of the first flute 17 and the rotation axis O1 from a radius of the base 3 (the cutting part 5) in the cross section orthogonal to the rotation axis O1. As used herein, the term "bottom" may be a portion of the first flute 17 which is closest to the rotation axis O1. The depth D2 of the second flute 21 may be defined similarly to the depth of the first flute 17.

For example, cemented carbide and cermet may be usable as a material of the base 3. Examples of composition of the cemented carbide may include WC—Co, WC—TiC—Co and WC—TiC—TaC—Co, in which WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). The above materials may be shown by way of illustration, and the material of the base 3 is not limited thereto.

A surface of the base 3 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Method for Manufacturing Machined Product>

A method for manufacturing a machined product 101 in a non-limiting embodiment of the present disclosure may be described below with reference to the drawings.

The machined product 101 may be manufacturable by carrying out a cutting process of a workpiece 103. The method for manufacturing the machined product 101 in the non-limiting embodiment of the present disclosure may include the following steps (1) to (4).

Figure 11:
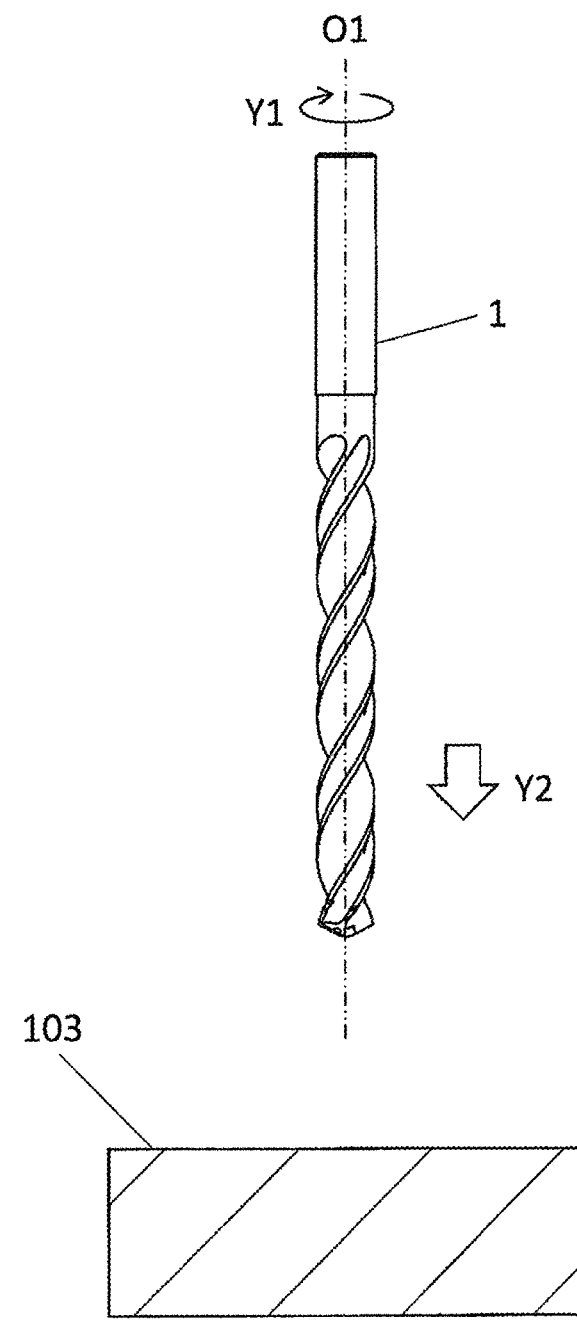
FIG. 11 is a schematic diagram illustrating one of steps in a method for manufacturing a machined product in a non-limiting embodiment of the present disclosure.

(1) Putting the drill 1 above the prepared workpiece 103 (refer to FIG. 11).

Figure 12:
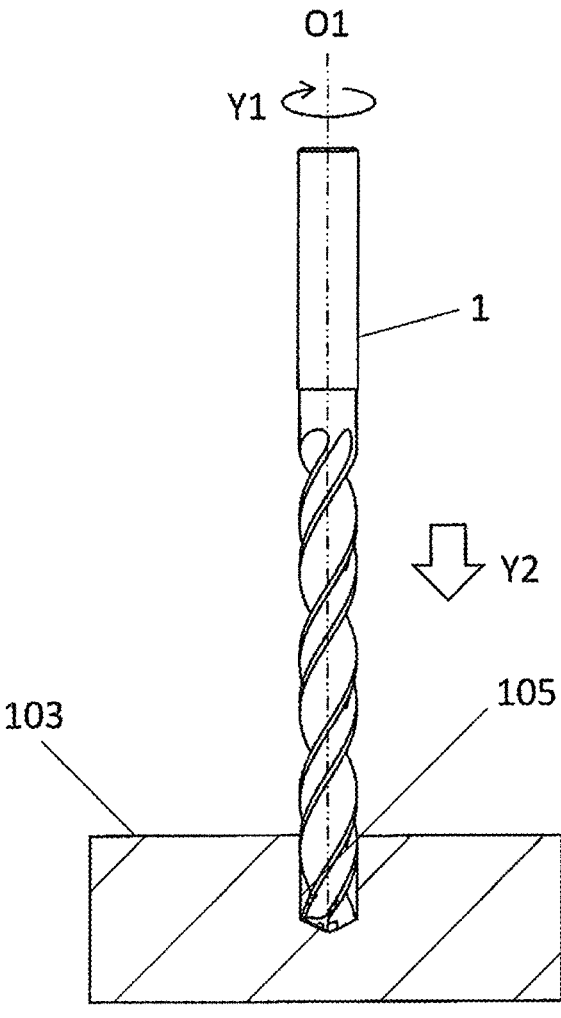
FIG. 12 is a schematic diagram illustrating one of the steps in the method for manufacturing a machined product in the non-limiting embodiment of the present disclosure.

(2) Rotating the drill 1 around the rotation axis O1 in a direction of an arrow Y1, and bringing the drill 1 near the workpiece 103 in a Y2 direction (refer to FIGS. 11 and 12).

The above steps (1) and (2) may be carried out by, for example, fixing the workpiece 103 onto a table of a machine tool with the drill 1 attached thereto, and by bringing the drill 1 being rotated near the workpiece 103. In the step (2), the workpiece 103 and the drill 1 may be brought close to each other. For example, the workpiece 103 may be brought near the drill 1.

(3) Forming a machined hole 105 in the workpiece 103 by bringing the drill 1 further near the workpiece 103 so that the drill 1 being rotated comes into contact with a desired position on a surface of the workpiece 103 (refer to FIG. 12).

In the step (3), the cutting process may be carried out so that at least a part of the cutting part 5 in the base 3 is located in a machined hole 105. Alternatively, setting may be made so that the shank part 7 in the base 3 is located outside the machined hole 105. From the viewpoint of obtaining a good finished surface, setting may be made so that a part of the cutting part 5 which is located close to the second end 3b is located outside the machined hole 105. The above part may be servable as a margin region for discharging chips, thereby offering excellent chip discharge performance through the region.

Figure 13:
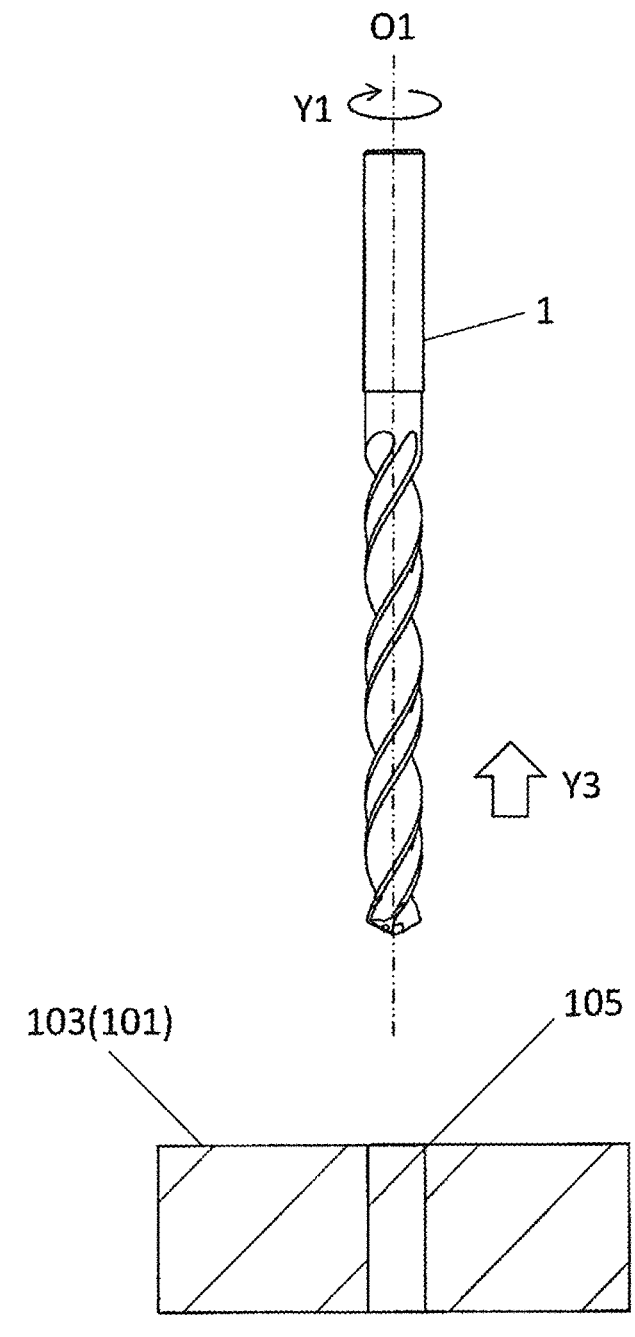
FIG. 13 is a schematic diagram illustrating one of the steps in the method for manufacturing a machined product in the non-limiting embodiment of the present disclosure.

(4) Moving the drill 1 away from the workpiece 103 in a Y3 direction (refer to FIG. 13).

Also in the step (4), similar to the step (2), the workpiece 103 and the drill 1 may be separated from each other. For example, the workpiece 103 may be moved away from the drill 1.

Excellent machinability can be offered by carrying out the above steps. Specifically, if using the drill 1 in the method for manufacturing the machined product 101 in the non-limiting embodiment of the present disclosure, the machined product 101 having the highly accurate machined hole 105 may be obtainable because of enhanced chip discharge performance.

In cases where the above cutting process of the workpiece 103 is carried out a plurality of times and, for example, a plurality of machined holes 105 are formed in the single workpiece 103, the step of bringing the first cutting edge 15 and the second cutting edge 19 of the drill 1 into contact with different portions of the workpiece 103 may be repeated while keeping the drill 1 rotated.

Examples of material of the workpiece 103 may include aluminum, carbon steel, alloy steel, stainless steel, cast iron, nonferrous metals and carbon-fiber-reinforced plastic (hereinafter also referred to as "CFRP"). The workpiece 103 may be a laminate including a CFRP layer. The laminate may further include a metal layer, such as an aluminum layer. For example, the above laminate may be usable as a material of airplanes or the like.

The invention claimed is:

1. A drill, comprising:
a base extended along a rotation axis from a first end to a second end and being rotatable around the rotation axis, and being configured to perform a cutting process when rotated in a rotation direction around the rotation axis, the base comprising:
a first part including the first end and having a first outer diameter,
wherein the first part includes a first cutting edge extending from the first end,
a first flute that leads the first cutting edge relative to the rotation direction,
a second flute that follows the first cutting edge relative to the rotation direction,
a second part which is between the first cutting edge and the second end, and has a second outer diameter that is larger than the first outer diameter,
a step which is located between the first cutting edge and the second part and has a larger outer diameter as coming closer to the second part,
wherein:
a length of each of the first part and the second part is longer than a length of the step,
the step comprises:
a first step that is a non-cutting step, and
a second step that includes a second cutting edge such that the second step is a cutting step,
each of the first and second steps is located where the first outer diameter increases to the second outer diameter,
the second step is between the first cutting edge and the first step,
the second flute is between the first step and the second step relative to the rotation direction,
the first step leads second flute relative to the rotation direction, and
the second step follows the second flute relative to the rotation direction.

2. The drill according to claim 1, wherein a length from a first end part of the first step to a second end part of the second step is larger than a length of the second cutting edge in a direction along the rotation axis.

3. The drill according to claim 1, wherein a first imaginary straight line connecting an end part on a side of an outer periphery in the first cutting edge and the rotation axis is orthogonal to a second imaginary straight line connecting an end part on a side of the outer periphery in the second cutting edge and the rotation axis in a plan view from a side of the first end.

4. The drill according to claim 1, wherein an outer peripheral surface of the second part comprises a first portion connecting to the first flute on a rear side in the rotation direction, and a second portion connecting to the second flute on a rear side in the rotation direction, and a width of the first portion is larger than a width of the second portion in a cross section orthogonal to the rotation axis.

5. The drill according to claim 4, wherein the first portion comprises a first margin, the second portion comprises a second margin, and a width of the second margin is larger than a width of the first margin in the cross section.

6. The drill according to claim 5, wherein the first portion further comprises a first clearance connecting to the first margin on a rear side in the rotation direction, the second portion further comprises a second clearance connecting to the second margin on a rear side in the rotation direction, and a width of the first clearance is larger than a width of the second clearance in the cross section.

7. A method for manufacturing a machined product, comprising:

rotating the drill according to claim 1;

bringing the drill being rotated into contact with a workpiece; and moving the drill away from the workpiece.

8. The drill according to claim 1, wherein the first flute and the second flute are spiral.

9. The drill according to claim 1, wherein a width of the first flute is larger than a width of the second flute.

* * * * *